J. SUMNER.
APPARATUS FOR TRIMMING HEEL PADS, RUBBER SOLES AND TIPS FOR BOOTS AND SHOES, AND OTHER RUBBER ARTICLES.
APPLICATION FILED MAY 15, 1918.

1,333,882.

Patented Mar. 16, 1920.

WITNESSES.

INVENTOR.

UNITED STATES PATENT OFFICE.

JOHN SUMNER, OF LEYLAND, ENGLAND, ASSIGNOR TO WOOD-MILNE LIMITED, OF MANCHESTER, ENGLAND.

APPARATUS FOR TRIMMING HEEL-PADS, RUBBER SOLES AND TIPS FOR BOOTS AND SHOES, AND OTHER RUBBER ARTICLES.

1,333,882.

Specification of Letters Patent. Patented Mar. 16, 1920.

Application filed May 15, 1918. Serial No. 234,821.

*To all whom it may concern:*

Be it known that I, JOHN SUMNER, a British subject, residing at Leyland, county of Lancaster, England, have invented certain new and useful Improvements in Apparatus for Trimming Heel-Pads, Rubber Soles and Tips for Boots and Shoes, and other Rubber Articles, of which the following is a specification.

This invention relates to improvements in apparatus for trimming articles of rubber preferably of irregular or noncircular shape more particularly such as stationary heel pads, soles and tips for boots and shoes.

It consists of a rapidly revolving toothed or milling cutter set close to a stationary plate provided with a cutting edge and a rotary guide mounted over the revolving cutter to guide the edge of the article to be trimmed between it and the stationary cutter plate.

It will be fully described with reference to the accompanying drawings.

Figure 1:
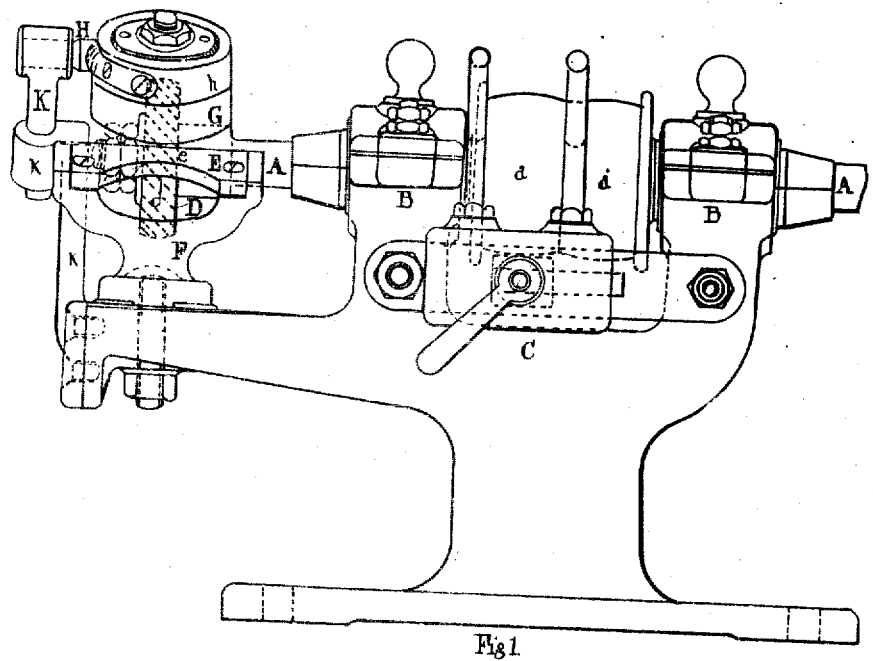

Figure 1. is a side elevation of the apparatus.

Figure 2:
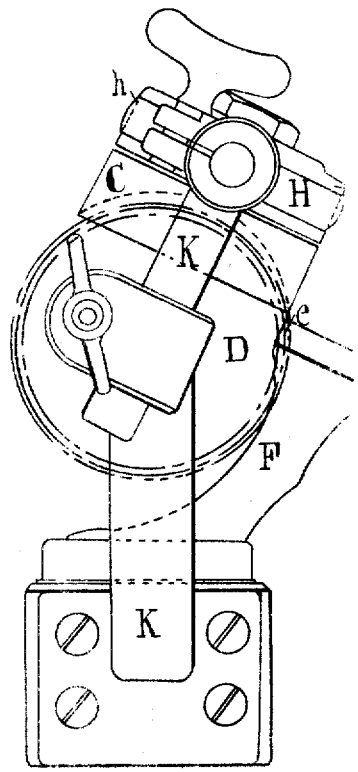

Fig. 2. is an end elevation.

Figure 3:
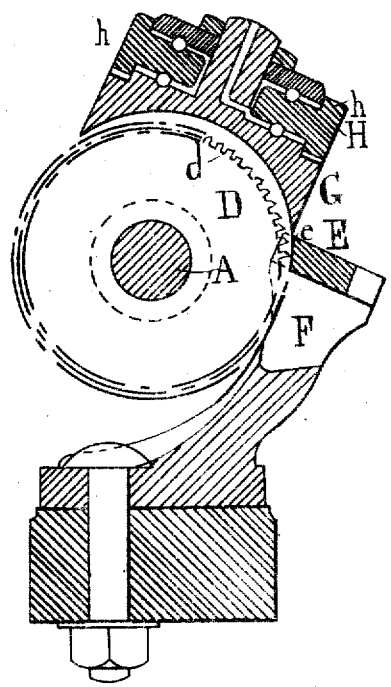

Fig. 3. is a transverse section through the operative parts of the apparatus.

Upon a spindle A journaled in bearings B of a headstock C and driven by fast and loose pulleys *a a'* a revolving toothed or milling cutter D is mounted capable of being rotated at a rapid rate. The cutting faces or teeth *d* of the cutter D are inclined as shown in dotted lines in Fig. 1. Adjacent to the cutter D a stationary steel plate E with a cutting edge *e* is set close to the periphery of the cutter D the plate E being rigidly affixed to a rest or bracket F. The cutter plate E is preferably set inclined and is beveled or curved on its under side to conform to the contour of the rotary cutter D.

Above the rotary cutter D a rotary guide G is mounted to guide or direct the edge of the article to be trimmed between the cutting faces of the rotary cutter D and the cutter plate E. The guide G is concave on its under surface to project down over the rotary cutter D to permit of its forward guiding edge approaching the cutting faces of the two cutters.

The rotary guide G is carried by a bracket H with a circular head *h* upon which it is carried on ball bearings the bracket H being adjustably supported by a rod or bar K clamped in a bracket *k* rigidly attached to the frame of the headstock C.

The edges of the article to be trimmed are presented to the cutting faces of the rotary cutter D and the cutter plate E and the waste portions are cut off by the scissor or shearing motion between the two cutting members the article being guided to the cutters by the rotary guide G the rotary movement of the latter facilitating the turning of the article as its edge is being trimmed.

What I claim as my invention and desire to protect by Letters Patent is:—

1. In apparatus for trimming the edges of rubber articles the combination with a stationary cutter plate of a rapidly revolving toothed or milling cutter and a rotary guide mounted above the cutters to direct the edges of the articles thereto.

2. In apparatus for trimming the edges of rubber articles the combination with a stationary cutter plate of a rapidly revolving toothed or milling cutter with inclined cutting surfaces.

In testimony whereof I have hereunto set my hand in presence of two subscribing witnesses, this 29 day of April 1918.

JOHN SUMNER.

Witnesses:
J. OWDEN O'BRIEN,
GEO. H. O'BRIEN.